(12) United States Patent
Harvey

(10) Patent No.: US 12,242,234 B2
(45) Date of Patent: *Mar. 4, 2025

(54) HEURISTIC METHOD OF AUTOMATED AND LEARNING CONTROL, AND BUILDING AUTOMATION SYSTEMS THEREOF

(71) Applicant: PassiveLogic, Inc., Holladay, UT (US)

(72) Inventor: Troy Aaron Harvey, Brighton, UT (US)

(73) Assignee: PassiveLogic, Inc., Holladay, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,763

(22) Filed: Jul. 10, 2023

(65) Prior Publication Data

US 2023/0350355 A1    Nov. 2, 2023

Related U.S. Application Data

(63) Continuation of application No. 17/867,645, filed on Jul. 18, 2022, now Pat. No. 11,733,662, which is a continuation of application No. 16/921,903, filed on Jul. 6, 2020, now Pat. No. 11,392,096, which is a continuation of application No. 16/006,715, filed on Jun. 12, 2018, now Pat. No. 10,705,492.

(60) Provisional application No. 62/518,497, filed on Jun. 12, 2017.

(51) Int. Cl.
*G05B 13/04*  (2006.01)
*G05B 13/02*  (2006.01)
*G05B 15/02*  (2006.01)
*G05B 17/02*  (2006.01)
*F24F 11/63*  (2018.01)

(52) U.S. Cl.
CPC ....... *G05B 13/048* (2013.01); *G05B 13/0265* (2013.01); *G05B 15/02* (2013.01); *G05B 17/02* (2013.01); *F24F 11/63* (2018.01); *G05B 2219/2642* (2013.01)

(58) Field of Classification Search
CPC .. G05B 13/048; G05B 13/0265; G05B 15/02; G05B 17/02; G05B 2219/2642; F24F 11/63
See application file for complete search history.

(56) References Cited

U.S. PATENT DOCUMENTS

| | | | |
|---|---|---|---|
| 4,385,384 A | | 5/1983 | Rosbury et al. |
| 5,224,648 A | * | 7/1993 | Simon ..................... F24F 11/63 236/51 |
| 5,519,834 A | | 5/1996 | Kamerman et al. |
| 6,119,125 A | * | 9/2000 | Gloudeman ............ G06F 8/20 719/321 |
| 6,967,565 B2 | * | 11/2005 | Lingemann ............ G05B 15/02 715/740 |

(Continued)

*Primary Examiner* — Ramesh B Patel

(57) ABSTRACT

Apparatuses, systems, and methods of physical-model based building automation using in-situ regression to optimize control systems are presented. A simulation engine is configured to simulate a behavior or a controlled system using a physical model for the controlled system. A data stream comprises data from a controlled system. A training loop is configured to compare an output of a simulation engine to a data stream using a heuristic so that a physical model is regressed in a manner that the output of the simulation engine approaches the data stream.

20 Claims, 5 Drawing Sheets

(56) References Cited

U.S. PATENT DOCUMENTS

| | | | | | |
|---|---|---|---|---|---|
| 7,010,789 | B1* | 3/2006 | Kimelman | ............ | G06F 9/5066 |
| | | | | | 718/100 |
| 7,302,361 | B2 | 11/2007 | Baleta et al. | | |
| 7,372,379 | B1* | 5/2008 | Jia | ............ | H03M 7/42 |
| | | | | | 341/67 |
| 7,840,913 | B1 | 11/2010 | Agrawal et al. | | |
| 8,024,511 | B2 | 9/2011 | Weddle | | |
| 8,352,651 | B2 | 1/2013 | Parfitt | | |
| 9,020,647 | B2* | 4/2015 | Johnson | ............ | F24F 11/62 |
| | | | | | 700/277 |
| 9,035,479 | B1* | 5/2015 | Gates | ............ | G06Q 50/06 |
| | | | | | 290/43 |
| 9,258,201 | B2* | 2/2016 | McCoy | ............ | H04L 43/50 |
| 9,298,197 | B2* | 3/2016 | Matsuoka | ............ | F24F 11/62 |
| 9,557,750 | B2* | 1/2017 | Gust | ............ | F24F 11/58 |
| 9,664,400 | B2* | 5/2017 | Wroblewski | ............ | F24F 11/30 |
| 10,705,492 | B2* | 7/2020 | Harvey | ............ | G05B 17/02 |
| 10,969,133 | B2 | 4/2021 | Harvey | | |
| 11,392,096 | B2* | 7/2022 | Harvey | ............ | G05B 15/02 |
| 11,394,574 | B2 | 7/2022 | Harvey | | |
| 11,733,662 | B2* | 8/2023 | Harvey | ............ | G05B 13/048 |
| | | | | | 700/276 |
| 11,743,069 | B2 | 8/2023 | Harvey | | |
| 11,982,993 | B2* | 5/2024 | Cella | ............ | B25J 13/00 |
| 2002/0152298 | A1* | 10/2002 | Kikta | ............ | H04L 67/125 |
| | | | | | 709/223 |
| 2005/0097161 | A1* | 5/2005 | Chiou | ............ | H04W 16/18 |
| | | | | | 709/200 |
| 2006/0106530 | A1* | 5/2006 | Horvitz | ............ | G08G 1/0104 |
| | | | | | 340/933 |
| 2007/0055392 | A1* | 3/2007 | D'Amato | ............ | G05B 13/048 |
| | | | | | 700/44 |
| 2008/0082183 | A1* | 4/2008 | Judge | ............ | G05B 15/02 |
| | | | | | 700/32 |
| 2014/0016572 | A1* | 1/2014 | Cave | ............ | H04W 74/0841 |
| | | | | | 370/329 |
| 2014/0277765 | A1* | 9/2014 | Karimi | ............ | G05B 15/02 |
| | | | | | 700/276 |
| 2014/0288890 | A1* | 9/2014 | Khainson | ............ | G16H 40/20 |
| | | | | | 703/1 |
| 2014/0330611 | A1* | 11/2014 | Steven | ............ | G06F 17/10 |
| | | | | | 705/7.24 |
| 2014/0358291 | A1* | 12/2014 | Wells | ............ | G05D 23/1902 |
| | | | | | 700/276 |
| 2015/0025917 | A1* | 1/2015 | Stempora | ............ | G02B 27/0093 |
| | | | | | 705/4 |
| 2015/0066229 | A1* | 3/2015 | Lacroix | ............ | G05F 1/66 |
| | | | | | 700/295 |
| 2015/0112497 | A1* | 4/2015 | Steven | ............ | G06F 30/20 |
| | | | | | 700/291 |
| 2016/0016454 | A1* | 1/2016 | Yang | ............ | B60R 16/037 |
| | | | | | 701/36 |
| 2016/0179075 | A1* | 6/2016 | Shin | ............ | G06F 3/016 |
| | | | | | 700/275 |
| 2016/0201934 | A1* | 7/2016 | Hester | ............ | F24F 11/89 |
| | | | | | 700/276 |
| 2017/0076206 | A1* | 3/2017 | Lastras-Montano | ............ | |
| | | | | | G06F 16/3344 |
| 2017/0103483 | A1* | 4/2017 | Drees | ............ | G06Q 10/06315 |
| 2017/0171580 | A1 | 6/2017 | Hirsch et al. | | |
| 2017/0289191 | A1 | 10/2017 | Thioux et al. | | |
| 2017/0315696 | A1* | 11/2017 | Jacobson | ............ | G06F 3/048 |
| 2017/0329289 | A1* | 11/2017 | Kohn | ............ | F24F 11/46 |
| 2018/0335759 | A1 | 11/2018 | Harvey | | |
| 2018/0359111 | A1 | 12/2018 | Harvey | | |
| 2023/0006859 | A1 | 1/2023 | Harvey | | |
| 2024/0144141 | A1* | 5/2024 | Cella | ............ | G06Q 10/06375 |

* cited by examiner

HEURISTIC METHOD OF AUTOMATED AND LEARNING CONTROL, AND BUILDING AUTOMATION SYSTEMS THEREOF

CROSS REFERENCES TO RELATED APPLICATIONS

This application is a continuation of U.S. patent application Ser. No. 17/867,657, now U.S. Pat. No. 11,733,662, entitled "AN AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH" and filed on Jul. 18, 2022 for Troy Aaron Harvey, which is a continuation of U.S. patent application Ser. No. 16/921,924, now U.S. Pat. No. 11,392,096, entitled "AN AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH" and filed on Jul. 6, 2020 for Troy Aaron Harvey, which is a continuation of U.S. patent application Ser. No. 16/007,963, now U.S. Pat. No. 10,705,492, entitled "AN AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH" and filed on Jun. 12, 2018 for Troy Aaron Harvey, which claims the benefit of U.S. Provisional Patent Application No. 62/518,745 entitled "AN AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH" and filed on Jun. 12, 2017 for Troy Aaron Harvey, each of which are incorporated herein by reference in their entirety for all purposes.

FIELD

The present disclosure relates to control of building systems using automated means. More specifically the present disclosure relates to a model-based building automation system wherein a method of heuristic tuning or regression fitting is utilized with live building data to automatically improve the system model. The present disclosure particularly addresses the control and automation of HVAC, energy, lighting, and/or irrigation systems.

BACKGROUND

Building automation systems are used in buildings to manage energy systems, HVAC systems, irrigation systems, accessory building systems, controllable building structures, and the like.

There has been little effort toward incorporating these systems into a controller with a unified operational model, thus allowing a more intelligent means of managing the energy interrelationships between various building components and their respective control algorithms. This is due, in part, to the fact that the field has been dominated by model-free control loops, which have difficulty managing sophisticated, tightly-coupled systems or adaptively tuning complex models in a predictable manner.

There have been studies exploring the concept of automated commissioning, however the methods used to date have typically required an occupancy-free training period, during which the building is subjected to an artificial test regime, which limits the potential for retro-commissioning or continuous commissioning. More importantly, the work to date has been limited to simple HVAC systems having topologies known a priori, and lacks the ability to scale to complex ad hoc arrangements that represent the diversity of building topologies. In addition, the existing approaches lack a method of combined commissioning of non-HVAC or climate-adaptive energy interactive building components.

Efforts towards closed-loop control system auto-commissioning and optimization have been limited. Most efforts in the area of auto-commissioning have focused on a specific problem set, for example VAV commissioning, or air handler commissioning. The majority of the efforts to date have focused on manual commissioning through user analysis of building automation system data, user-driven computer tools for management of the commissioning process, commissioning test routines, or fault detection.

Recently, the most common approach in the industry has been to focus on building and energy monitoring and analytics with the intent of providing an energy "dashboard" for the building. The most sophisticated examples of dashboards provide statistical based diagnostics of equipment behavior changes, failures, or the like. This "outside-the-box-looking-in" approach can provide information, but relies on the administrator to understand the problem and close the loop, both of which are rare occurrences.

Efforts to date have used physical models as a reference, and benchmark the reference against the actual building using data mining to create control strategies. This requires a person in the loop, and thus limits applicability to projects with means for a highly skilled engineering team. It further requires buildings to be tested off-line, which is rarely acceptable.

Almost all building controls today are model-free. The model-free approach, while simple to implement, becomes quite difficult to manage and optimize as the complexity of the system increases. It also lacks the inherent self-knowledge to provide new approaches to programming, such as model-driven graphical programming, or govern the interconnections between components and sub-system synergistics.

Physical model based approaches to date have been limited in scope and specific to known models defined a-priori. They have thus lacked the ability to enable users to create n-complex systems of interconnected sub-systems by ad hoc means, use simple graphical user interfaces to define a system, or enable system model to evolve their control optimization and commissioning over time in situ.

SUMMARY

The present disclosure applies a closed loop, heuristically tuned, model-based control algorithm to building automation.

There are several advantages that can be gained from applying model-based control to building automation systems.

Model based control allows for altering control schemes based on external factors including but not limited to weather, occupancy, and user input. The physical system model allows for simulation of these external factors' effects on building comfort and efficiency. Once the effects of said factors on the system are known the controller can take the necessary control actions to compensate for the effects. For example, in some embodiments, a building with higher occupancy will require less heating or more cooling to offset the heat generated by the occupants.

Model based control allows for inclusion of predicted external factors. For example, in some embodiments, future weather predictions can be taken into account when deciding on control actions. This would allow the controller to more effectively utilize resources by building up energy stores while it is cheap and depleting stores when resources are expensive. In some embodiments, future occupancy predictions may be included in the model-based control system. A schedule may be monitored and comfort settings may be allowed to be changed to prioritize other factors like energy efficiency during times no occupancy is expected.

Model based control enables the system controller to consider any and all external and/or intrinsic influencing factors from all periods of time, current, past or future. This enables what may be called "future-forward control". This is the generation of a sequence or control regime prior to the application of the control regime.

Model based control allows for less complicated commissioning. The controller can perform the abstraction of the system into mathematical models. Removing this level of abstraction from the user allows for faster, easier, more accurate, and more flexible model creation.

Model based control also provides system labeling through a means of ontology. Because the purpose, behavior, and semantics of that behavior are known statically, the system can interpret the meaning of equipment or object behavior during runtime. Regressions of equipment models within the scope of their known ontologies enable adaptively fitted models in situ, and also detect faults as models lose compliance with their fit.

Model based control allows for real time system monitoring and software repair. By including a model of all of the equipment in the system, and sensing equipment performance, the controller may sense equipment faults when there is a significant divergence between system simulation outputs and sensor data. Because the controller has a model of the equipment's, sub-system's, or system's predicted operation, any deviation from normal operation may be investigated automatically. The knowledge of a fault allows for diagnostic, remediation, and/or alerting actions to be taken by the controller. The remediation of soft equipment faults is beneficial as it replaces the need for human interaction with malfunctioning equipment.

Model based control allows for changing control actions in response to time varying parameters. These parameters include but are not limited to equipment aging, weather, occupancy, equipment fault, insulation values, resource costs, and/or user input. Each of these parameters will affect control path calculations.

All of the benefits of model-based control systems may be extended by employing heuristic techniques which adjust based on past regressions. By allowing the model to be tuned by heuristics based on past regressions, the model can compensate for inaccuracies in the originally included data. The model can also interpolate unknown values to facilitate more complete system optimization.

While model based control can require increased user handling of parameters to fit a model to a controlled application, the present disclosure describes a methodology by which real-time regressions of stored "future-forward" control predicted sequences are compared to the actual time series of events as resulting from that control. This methodology can allow model based control to automate a system, then constantly learn from the system to tune its parameters so that only limited data is required to set up a system. This disclosure describes the method by which a fitted system can detect the system falling out of compliance through the same regression methodology.

DESCRIPTION OF THE DRAWINGS

To further clarify various aspects of some example embodiments of the present disclosure, a more particular description of the disclosure will be rendered by reference to specific embodiments thereof that are illustrated in the appended drawings. It is appreciated that the drawings depict only illustrated embodiments of the disclosure and are therefore not to be considered limiting of its scope. The disclosure will be described and explained with additional specificity and detail through the use of the accompanying drawings in which.

DESCRIPTION

The embodiments of the present disclosure described herein are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the disclosure and together with the description, serve to explain the principles of the disclosure. To the accomplishment of the foregoing and related ends, certain illustrative aspects of the disclosure are described herein in connection with the following description and the annexed drawings. These aspects are indicative, however of, but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

Explanation will be made below with reference to the figures referenced above for illustrative embodiments concerning the predictive building control loop according to the current disclosure.

Figure 1:
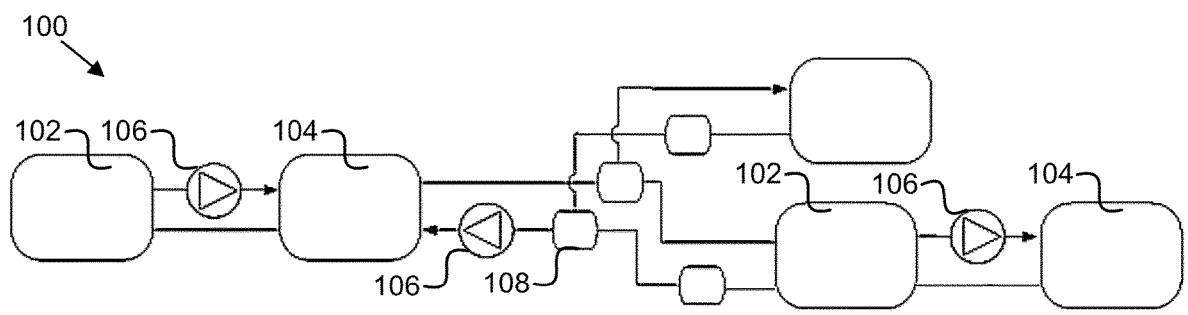
FIG. 1—Physical model system block diagram.
Figure 5:
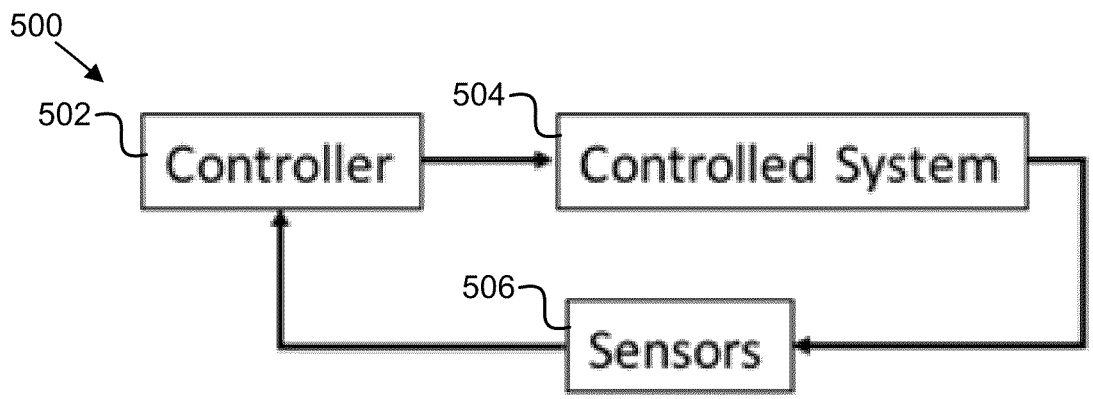
FIG. 5—Architectural embodiment of a building control loop.

A building control system contains a control loop 500 such as illustrated in FIG. 5. The control loop contains a controller 502 that makes decisions based on sensor 506 data or some other feedback mechanism. The control decisions are then applied to the controlled system 504. The controller 502 may be comprised of systems including but not limited to software, hardware, mechanical, and/or cloud based systems. The resulting effects on the system 504 are monitored by the feedback mechanism. An example of a building control loop 500 is: the sensor 506 data is comprised of an air temperature sensor 506, the controller 502 is comprised of a thermostat, and the controlled system 504 is comprised of a furnace, fan, air conditioner, and building. In this case the furnace and air conditioner are sources, the fan is a transport, and the building is a sink. The controlled system 504 can be represented as in FIG. 1; a system 100 comprised of sources 102, sinks 104, and transports 106, possibly with other intermediate components 108.

Figure 4:
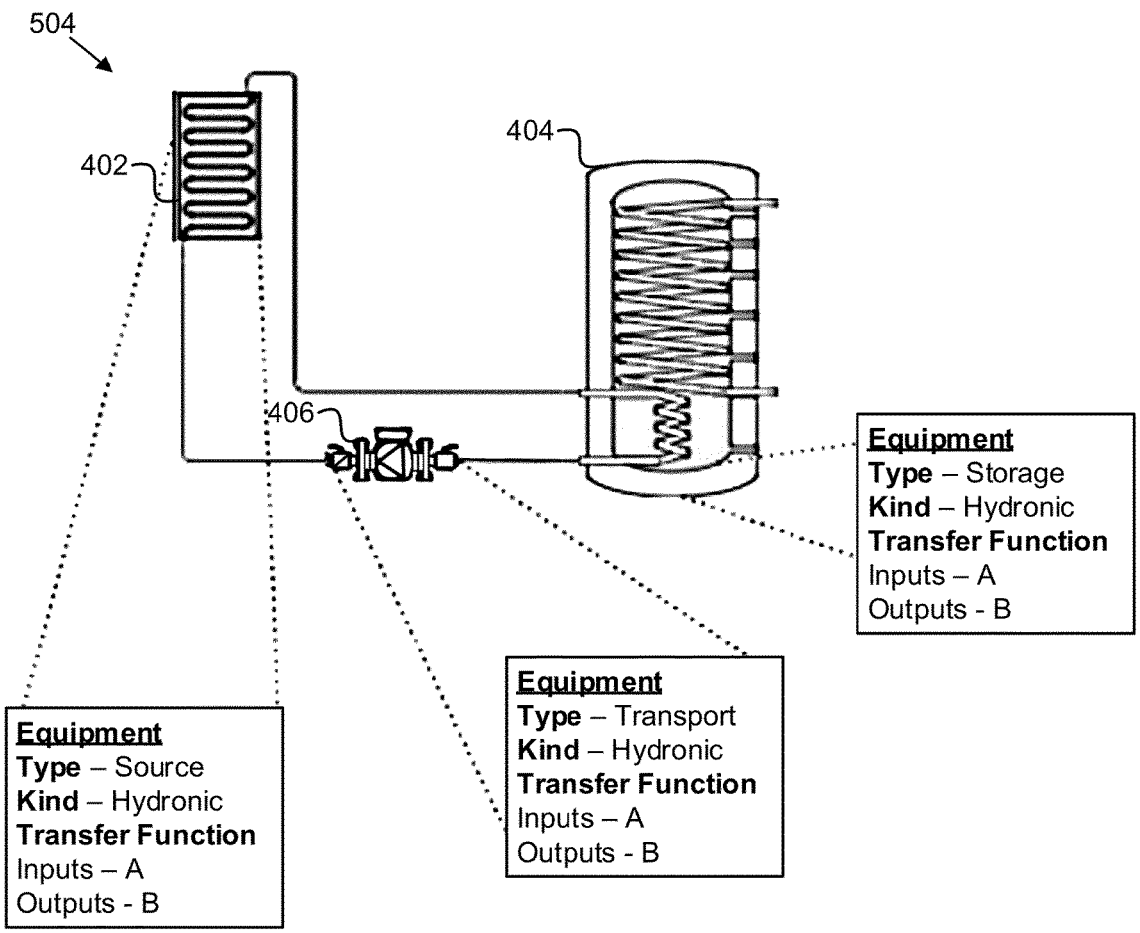
FIG. 4—Architectural embodiment of an example of a simple controlled system.

Another embodiment of a controlled system 504 is shown in FIG. 4. In FIG. 4 the controlled system 504 is comprised of a heat exchanger 402 acting as a source 102, a pump 406 as a transport 106, and a storage tank 404 as a sink 104.

Figure 2:
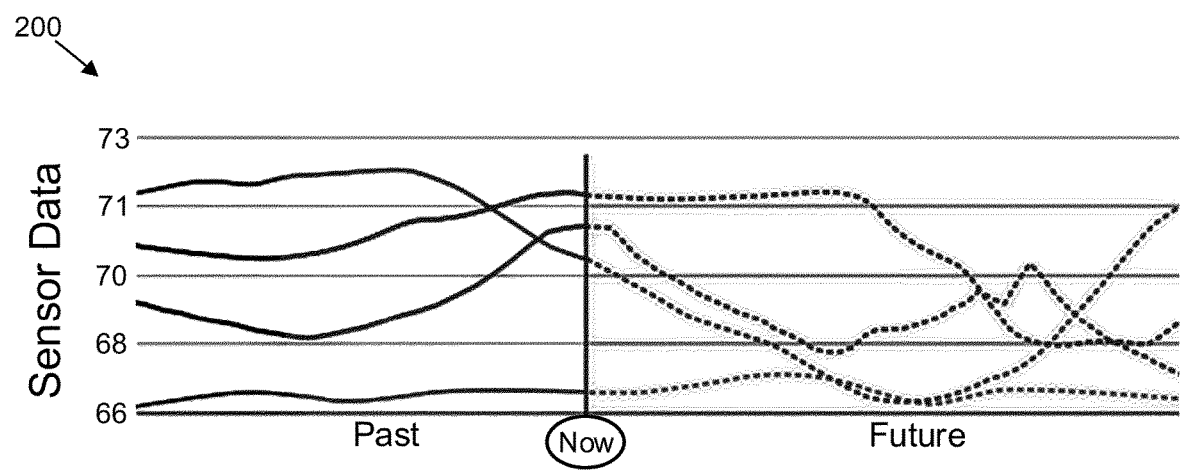
FIG. 2—Historical and predicted sensor values and time-series thereof.

One embodiment 200 in FIG. 2 shows how multiple sensors 506 may simultaneously feed data back to the controller 502 in a time series. This time series data may then be extended into the future by outputs of the simulation engine 602.

Figure 3:
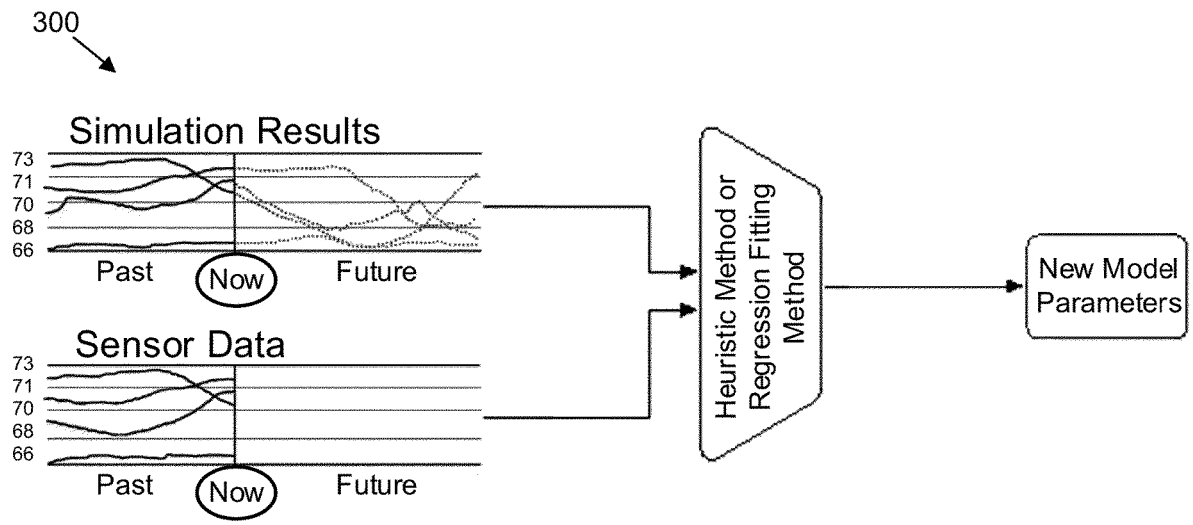
FIG. 3—Heuristic or regression fitting method.

The simulation engine 602 output may be compared with the actual sensor 506 data as shown in FIG. 3. By using a heuristic tuning method 300 any difference between the simulation engine 602 output and the sensor 506 data can be used to tune the physical model 604 parameters to better represent the controlled system 504. By constantly optimizing the model 604, any uncertainty or inaccuracy in the model(s) 604 can be rectified.

Figure 6:
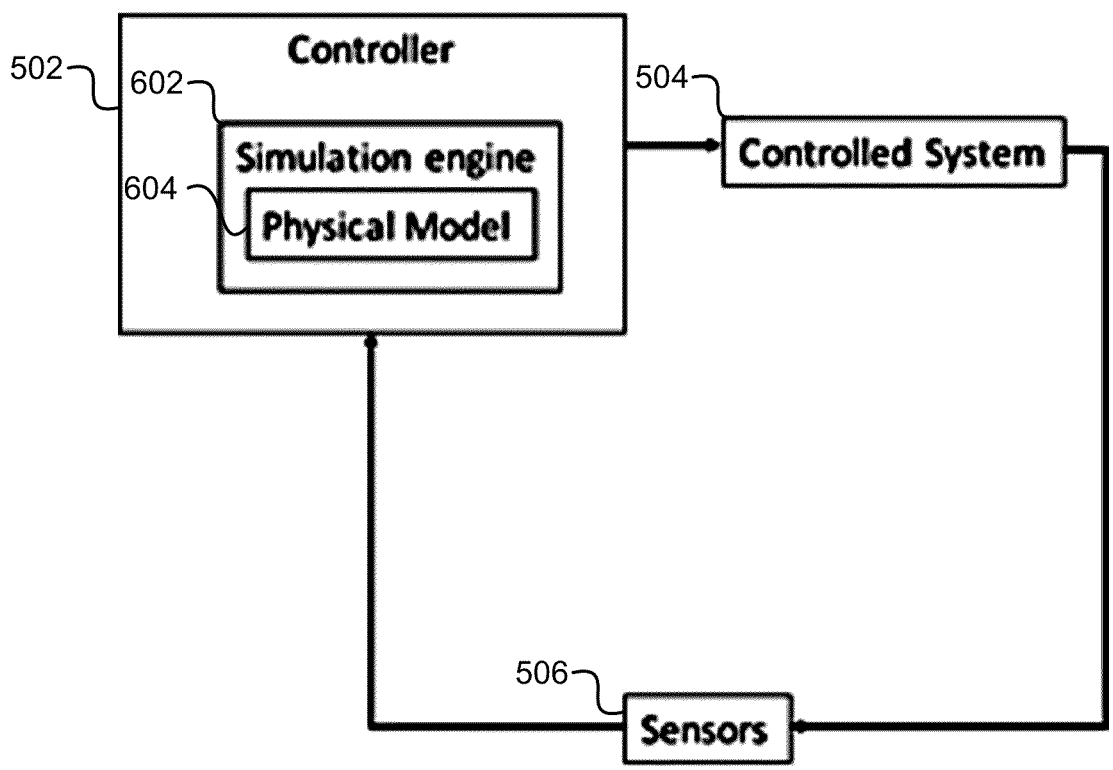
FIG. 6—Architectural embodiment of a building control loop containing a simulation engine wherein the simulation engine contains a physical model.

FIG. 6 shows a controller 502 containing a simulation engine 602. The simulation engine 602 in FIG. 6 may allow the building system controller 502 to predict the outcome of any available control action using its physical model 604 of the system 504. Said predictions have many benefits, some of which are detailed below.

The physical model 604 is defined as any model of the controlled system 504. The physical model 604 may be time variant. One form of time variance that may be included in the physical model 604 is comprised of heuristics. By employing heuristics, any control action may be evaluated, based on feedback from sensor 506 data or some other form of feedback, to evaluate whether the control action had the intended effect. If the control action did not have the intended effect, the physical model 604 may be changed to exert more effective control actions in the future.

Figure 7:
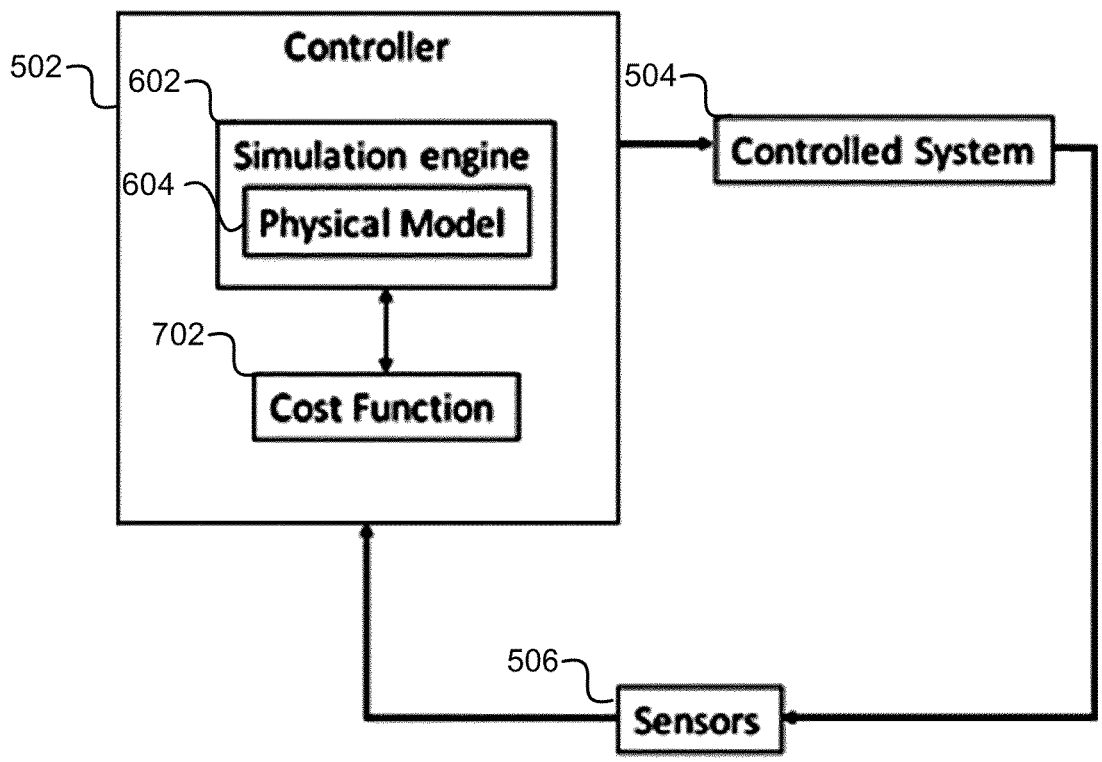
FIG. 7—Architectural embodiment of a building control loop containing a simulation engine and cost function wherein the simulation engine contains a physical model.

FIG. 7 shows how a cost function 702 may be applied to the simulation engine 602. Any and all resources may be given values in the cost function 702. Said resources include but are not limited to: natural gas, gasoline, propane, home heating oil, coal, water, electricity, emissions, equipment longevity, heat, and/or time outside of a defined comfort zone. Any possible control actions may be assessed according to the cost function 702 in order to discover the optimal control action according to the cost function 702. The cost function 702 may be time variant. The cost function 702 may be linked with factors including, but not limited to, monetary value of said resources, user preferences, and/or changes in the physical model 604.

Figure 8:
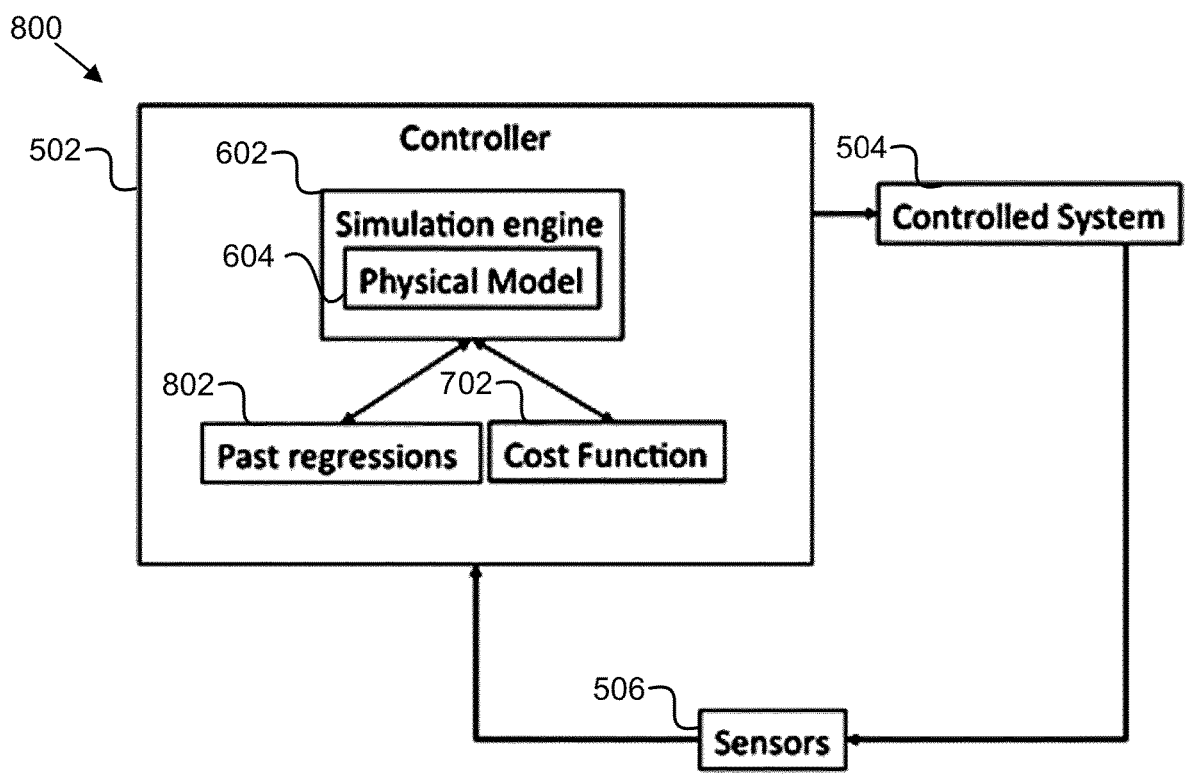
FIG. 8—Architectural embodiment of a building control loop containing a simulation engine and cost function wherein the simulation engine contains a physical model, which is tuned, based on past regressions.

FIG. 8 shows how heuristics may be included in a model-based building control system 800. Employing heuristics 802 with the physical model 604 allows the model 604 to be adaptive to issues such as time varying system elements, and/or inaccurate or incomplete starting datasets. By storing system reactions 802 to past control actions, the physical 604 model may be improved. Heuristics 802 may be implemented by comparing the data stream of the controlled system 504 to the output of the physical model-based simulation, as they respond to the same control stimuli. Any difference may be corrected by changing physical model 604 inputs to influence the physical model 604 outputs to match the data stream of the real world system 504. The use of a heuristic 802 or regression 802 algorithm to tune physical model 604 parameters allows for substantial increases in system optimization, efficiency, and stability.

Figure 9:
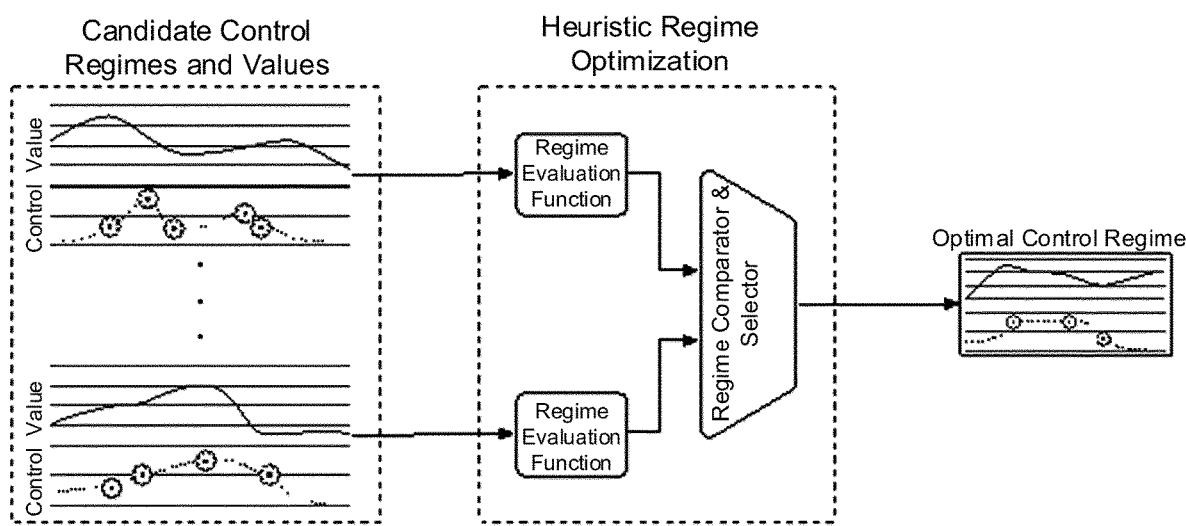
FIG. 9—Selection of optimal control regime from candidate control regimes.

FIG. 9 shows how candidate control schemes, comprising a collection of control actions and corresponding valuation of the control actions, may be evaluated and compared, thus allowing for selection of the optimal control scheme among the candidates.

Although the disclosure has been explained in relation to certain embodiments, it is to be understood that many other possible modifications and variations can be made without departing from the spirit and scope of the disclosure.

What is claimed is:

1. A controller for adjusting a model of a controlled system, the controller comprising:
   a memory; and
   a processor in communication with the memory and configured to:
   receive a data stream from the controlled system;
   simulate a behavior of the controlled system using a physical model of the controlled system to produce a model output,
   compare the model output to the data stream producing a difference between the model output and the data stream, and
   use the difference between the model output and the data stream to adjust the physical model.

2. The controller of claim 1, wherein when the model output approaches the data stream sufficiently closely, using the physical model to predict a future value of the data stream.

3. The controller of claim 2, wherein when the model output approaches the data stream sufficiently closely step comprises at least one of: finding a reduction in error between values of the data stream and values of the model output to within an arbitrary threshold; finding a reduction in uncertainty between values of the data stream and values of the model output; finding a reduction in uncertainty of values of the model output to within an arbitrary threshold; reaching an arbitrary threshold on number of erroneous values of the model output; reaching an arbitrary threshold on number of accurate values of the model output; reaching an arbitrary threshold on number of values in the model output; and reaching an arbitrary threshold on computational time spent.

4. The controller of claim 1, wherein the data stream comprises sensor measurements, equipment state, environmental data, occupant input, or occupant behavior.

5. The controller of claim 1, wherein adjusting the physical model comprises adjusting parameters of the physical model or modifying inputs of the physical model.

6. The controller of claim 1, wherein the compare the model output to the data stream comprises using a cost function.

7. The controller of claim 6, wherein the cost function is time variant.

8. The controller of claim 1, wherein the adjust the physical model comprises regressing the physical model using a difference of the model output and the data stream to determine at least one adjustment to the physical model.

9. The controller of claim 8, wherein regressing the physical model comprises regressing the physical model using differential comparison.

10. A method executed by at least one processor for modifying a physical model of a controlled system, the method comprising:
receiving, by the at least one processor, a data stream from the controlled system;
simulating a behavior of the controlled system using a physical model of the controlled system to produce a model output,
comparing the model output to the data stream producing a difference between the model output and the data stream, and
using the difference between the model output and the data stream to adjust the physical model.

11. The method of claim 10, wherein the model output that approaches the data stream sufficiently closely step comprises one or more of finding a reduction in error between values of the data stream and values of the model output to within an arbitrary threshold; finding a reduction in uncertainty between values of the data stream and values of the model output to within an arbitrary threshold; finding a reduction in uncertainty of values of the model output to within an arbitrary threshold; reaching an arbitrary threshold on number of erroneous values of the model output; reaching an arbitrary threshold on number of accurate values of the model output; reaching an arbitrary threshold on number of values in the model output; and reaching an arbitrary threshold on computational time spent.

12. The method of claim 10, wherein the data stream comprises sensor measurements, equipment state, environmental data, occupant input, or occupant behavior.

13. The method of claim 10, wherein when the model output approaches the data stream sufficiently closely, using output of the physical model predict the data stream into a future.

14. The method of claim 10, further comprising using a cost function to evaluate difference between the data stream and the model output.

15. The method of claim 14, wherein the cost function is time variant.

16. The method of claim 10 wherein adjusting the physical model comprises making a modification to model inputs or making a modification to model parameters.

17. A non-transitory machine-readable medium encoded with instructions for execution by a processor for modifying a physical model of a controlled system, the non-transitory machine-readable medium comprising:
instructions for receiving, by the processor, a data stream from the controlled system;
instructions for simulating a behavior of the controlled system using a physical model of the controlled system to produce a model output,
instructions for comparing the model output to the data stream producing a difference between the model output and the data stream, and
instructions for using the difference between the model output and the data stream to adjust the physical model.

18. The non-transitory machine-readable medium of claim 17, further comprising instructions for using the physical model to predict a future value of the data stream when the model output approaches the data stream sufficiently closely.

19. The non-transitory machine-readable medium of claim 17, wherein the data stream comprises sensor measurements, equipment state, environmental data, occupant input, or occupant behavior.

20. The non-transitory machine-readable medium of claim 17, further comprising further comprising instructions for using a cost function to evaluate difference between the data stream and the model output.

* * * * *